United States Patent [19]

Nash et al.

[11] Patent Number: 4,947,037

[45] Date of Patent: Aug. 7, 1990

[54] OPTICAL SENSING SYSTEM WITH LIGHT PULSES

[75] Inventors: Philip J. Nash, Somerset; Christopher Lamb, Dorset, both of England

[73] Assignee: Plessey Overseas Limited, Ilfrd-Essex, England

[21] Appl. No.: 337,088

[22] Filed: Apr. 12, 1989

[30] Foreign Application Priority Data

Jun. 14, 1988 [GB] United Kingdom ............... 8814067

[51] Int. Cl.$^5$ .......................... H01J 5/16; G01B 9/02
[52] U.S. Cl. ........................... 250/227.11; 250/231.1; 356/345
[58] Field of Search ........................ 250/227, 231 R; 356/345, 349, 73.1; 455/611, 610, 612, 618

[56] References Cited

U.S. PATENT DOCUMENTS

| | | | |
|---|---|---|---|
| 4,653,916 | 3/1987 | Henning et al. | 356/345 |
| 4,770,535 | 9/1988 | Kim et al. | 250/227 |
| 4,775,216 | 10/1988 | Layton | 356/345 |

FOREIGN PATENT DOCUMENTS

| | | | |
|---|---|---|---|
| 0203682 | 12/1986 | European Pat. Off. | 356/345 |
| 2152689 | 8/1985 | United Kingdom | 356/345 |

Primary Examiner—David C. Nelms
Assistant Examiner—Michael Mossinger
Attorney, Agent, or Firm—Fleit, Jacobson, Cohn, Price, Holman & Stern

[57] ABSTRACT

Many optical sensing systems include an interferometer comprising a plurality of contiguous optical fibre sensor lengths with partially reflecting discontinuities therebetween. An inherent problem with these systems is however that the number of sensors that can be configured is limited by the pulse repetition or sensor interrogation rate. In the present system the pulse repetition rate is effectively increased without having to reduce optical fibre sensor lengths or numbers by interleaving several interrogating signals.

11 Claims, 6 Drawing Sheets

OPTICAL SENSING SYSTEM WITH LIGHT PULSES

BACKGROUND OF THE INVENTION

1. Field of the Invention

The present invention relates to optical sensing systems and more particularly, but not specifically to operation of such systems including an interferometer.

2. Description of Related Art

An optical sensing system may be constructed using an interferometer. The interferometer can comprise several lengths of optical fibre formed contiguously with partially reflecting discontinuities therebetween. Light pulses are introduced into the contiguous length of optical fibres such that a portion of each of these light pulses is reflected back along the contiguous length at each discontinuity. By suitable timing of the light pulses, interaction of reflected light pulses from respective successive partially reflective discontinuities can be achieved. This light pulse interaction is arranged to provide a composite heterodyne signal indicative of the optical fibre length or sensor constituted between the successive partially reflective discontinuities.

A typical approach taken to provide a composite heterodyne signal is to inject pairs of light pulses in timed succession, of specific pulse length and at mutually displaced or different frequencies. Thus, for example, there is a first light pulse $F_1$ and a second light pulse $F_2$. It will be appreciated that each light pulse $F_1$ and $F_2$ is reflected at each discontinuity. The timed succession of pulses $F_1$, $F_2$ is such that the partially reflected portions of pulse $F_1$ interact with the partially reflected portions of pulse $F_2$ to provide the composite heterodyne signal. If pulse $F_1$ precedes pulse $F_2$ upon injection into the contiguous length of optical fibre lengths then the partially reflected portion of pulse $F_1$ interacts with a partially reflected pulse of $F_2$ reflected by the immediately preceding partially reflective discontinuity.

Consider FIG. 1a and FIG. 1b, which illustrates respectively a prior sensing system and its timing diagram, wherein a pair of light pulses $F_1$, $F_2$ are injected regularly into the contiguous length of optical fibres with a time period 1 between each pair of respective pulses $F_1$, $F_2$. The light pulses $F_1$, $F_2$ are reflected by discontinuities DL, S1, S2, S3, S4, S5, . . . , SN, where N is an integral number, to provide partially reflected pulses $F_1DL$, $F_2DL$, $F_1SN$ and $F_2SN$. The first partially reflective discontinuity DL is the "dead" or down lead of the sensing system. The partially reflective pulses $F_1S1'$ and $F_2DL'$ i.e. the light pulse portions reflected by discontinuities S1 and D1 for pulses $F_1$ and $F_2$ respectively, interact to provide a heterodyne ($F_1S1'$-$F_2DL'$). The heterodyne ($F_1S1'$-$F_1DL'$) is indicative of the optical fibre length or sensor between discontinuities DL and S1 and is adaptive to changes therein. Thus, any change in the optical fibre sensor between discontinuities DL and S1 will be apparent in the heterodyne ($F_1S1'$-$F_2DL'$). Similarly partially reflected pulses for other discontinuities (S1, S2, S3, S4 and S5) will interact to give interactions indicative of their respective optical fibre lengths or sensors.

As will be appreciated it is important that all partially reflected pulses $F_1DL'$, $F_2DL'$, $F_1SN$ and $F_2SN$ have exited the contiguous length of optical fibre lengths before a next pair of light pulses can be injected into the contiguous length in order that pulse pairs from different sensor lengths do not overlap. Consequently, the pulse repetition rate or frequency is determined by the number of sensor lengths i.e. the more sensor lengths, the lower the pulse pair repetition rate.

In FIG. 2, a typical composite heterodyne signal 21 output is illustrated. The heterodyne signal 21 comprises a peak heterodyne frequency 23 with switching spikes 25 regularly spaced by increments of a pulse repetition frequency 27. It is the heterodyne frequency 23 which carries the information consequently the switching spikes 25 must be filtered out by suitably narrow filtering means. This filtering means in turn limits the maximum detectable modulation frequency of the sensing system. Thus, for example, an array of one hundred 200 meter long sensors will be limited to a maximum detectable modulation frequency of 1 KHz or less due to the low pulse repetition frequency allowed. However, if there is a requirement to detect acoustic frequencies up to 10 KHz, this reduces the allowable number of sensors to an inconvenient value of 10. The problem is to devise a system whereby the pulse pair repetition rate or frequency, and hence the maximum detectable modulation frequency, can be increased without reducing the number of sensor lengths.

Previously, the above problem has been ameliorated by decreasing pulse lengths and sensor length accordingly, however this reduces sensor sensitivity.

It is an objective of the present invention to provide a sensing system in which the detectable modulation frequency is enhanced with respect to the number of contiguous sensor lengths.

SUMMARY OF THE INVENTION

According to the present invention there is provided an optical sensing system comprising a light source coupled to a switching element and a plurality of optical sensors having a partially reflective discontinuity between adjacent sensors, the plurality of optical sensors being coupled to detector means, the switching element being arranged to provide, in operation, light pulse trains in succession in a defined time spaced order, the time spaced order of the light pulse trains being such that primary light pulses in a primary light pulse train are provided at a primary time period spacing at least equivalent to twice an inherent transit time period of light pulses to the end of each contiguous length of optical sensors whilst at least one intermediate light pulse in an intermediate light pulse train is provided at an intermediate time period with respect to primary light pulses, the intermediate time period being equivalent to a fixed fraction of the primary time period plus an inherent transit time period for light pulses across one sensor wherein respective primary and intermediate light pulses are respectively spaced and have a pulse length such that interaction between a reflected light pulse from a primary light pulse and a reflected light pulse from a intermediate light pulse is prevented.

Further in accordance with the present invention there is provided a method of operating an optical sensor system including a plurality of optical sensors arranged in at least one contiguous length and having partially reflective discontinuities between respective sensors arranged such that light pulse trains in mutual succession are injected into the plurality of optical sensors whereby said light pulses are partially reflected by the discontinuities to provide respective heterodyne signals upon detector means indicative of each optical sensor, the method comprising:

(i) providing primary light pulses in primary light pulse trains in a time spaced period at least equivalent to twice the inherent transit time for a pair of light pulses from injection to an end of the plurality of optical sensors; and, (ii) providing, at least one, intermediate light pulse in an intermediate light pulse train at an intermediate time spaced relationship with respect to each primary light pulse, said intermediate time spaced period being a fixed fraction of the primary time spaced periods, whilst the pulse length and respective spacing of light pulses in respective primary and intermediate light pulse trains is determined such that neither injected or reflected light pulses associated with the primary pulses interact upon the detector means with those light pulses associated with an intermediate pulse.

Preferably, the light pulses are either arranged in pairs at mutually differing frequencies or as single pulses whilst their pulse length is equivalent to the fixed fraction of the inherent transit time of a light pulse in an optical fibre sensor length. This fraction may be $\frac{1}{2}$.

The plurality of optical sensors may be configured into two, respectively contiguous, branches.

Embodiments of the present invention will now be described with reference to the accompanying drawings in which:

BRIEF DESCRIPTION OF THE DRAWINGS

FIG. 1b, illustrates respectively a timing diagram of the sensing system of FIG. 1a.

DESCRIPTION OF THE PREFERRED EMBODIMENT

Conventionally, each light pulse has a pulse length defined relative to the time period inherent for the light pulse to traverse a single optical fibre sensor length. In previous systems, this pulse length has been set at slightly less than twice the transit time of the light pulse across a sensor length. This maximises reflected pulse interaction. After a first light pulse has been sent, the subsequent time interval, corresponding to the array length, is completely filled with returning pulses. A second pulse pair cannot be sent until all returning pulses have returned. Consequently, the pulse repetition interval is equivalent to twice the inherent transit time of a light pulse to the end of the contiguous length of optical fibre sensors or array. In the present invention, the pulse length of each light pulse is shortened. Thus, additional pulses can be interleaved with conventionally timed pulses to raise the optical fibre sensor length interrogation or pulse repetition rate, so improving the range of acoustic frequencies that can be detected.

Figure 1A:
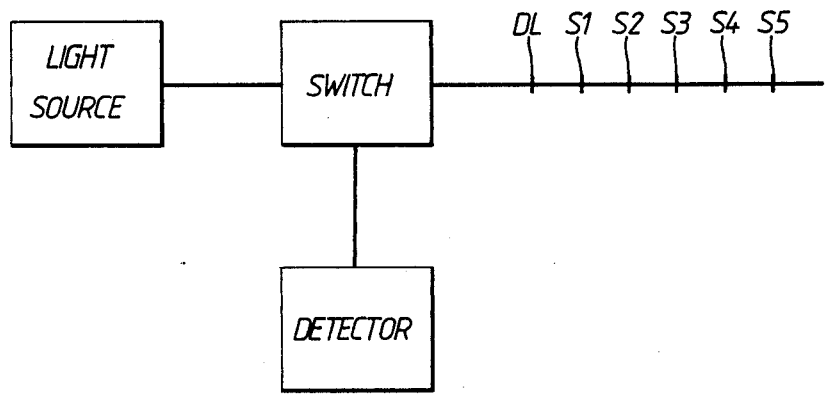
FIG. 1a illustrates a prior sensing system.
Figure 1B:
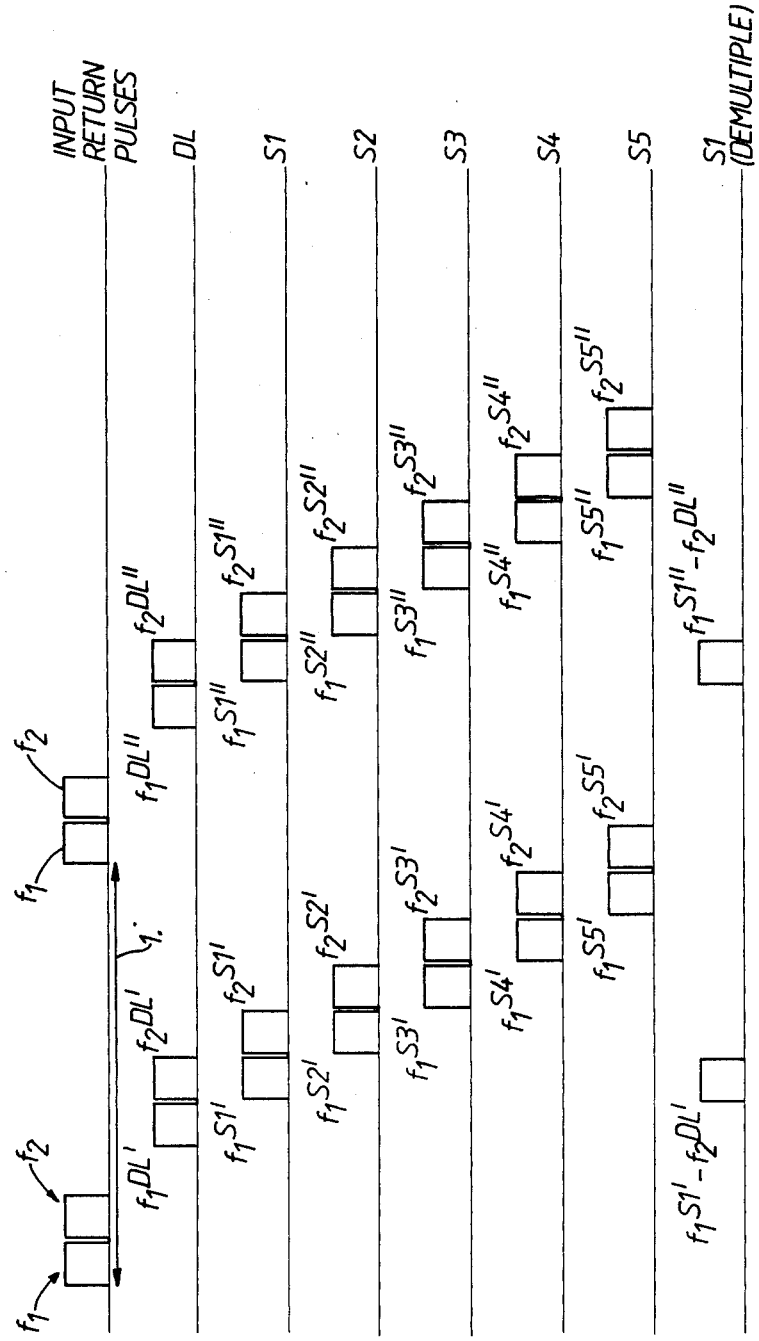
Figure 2:
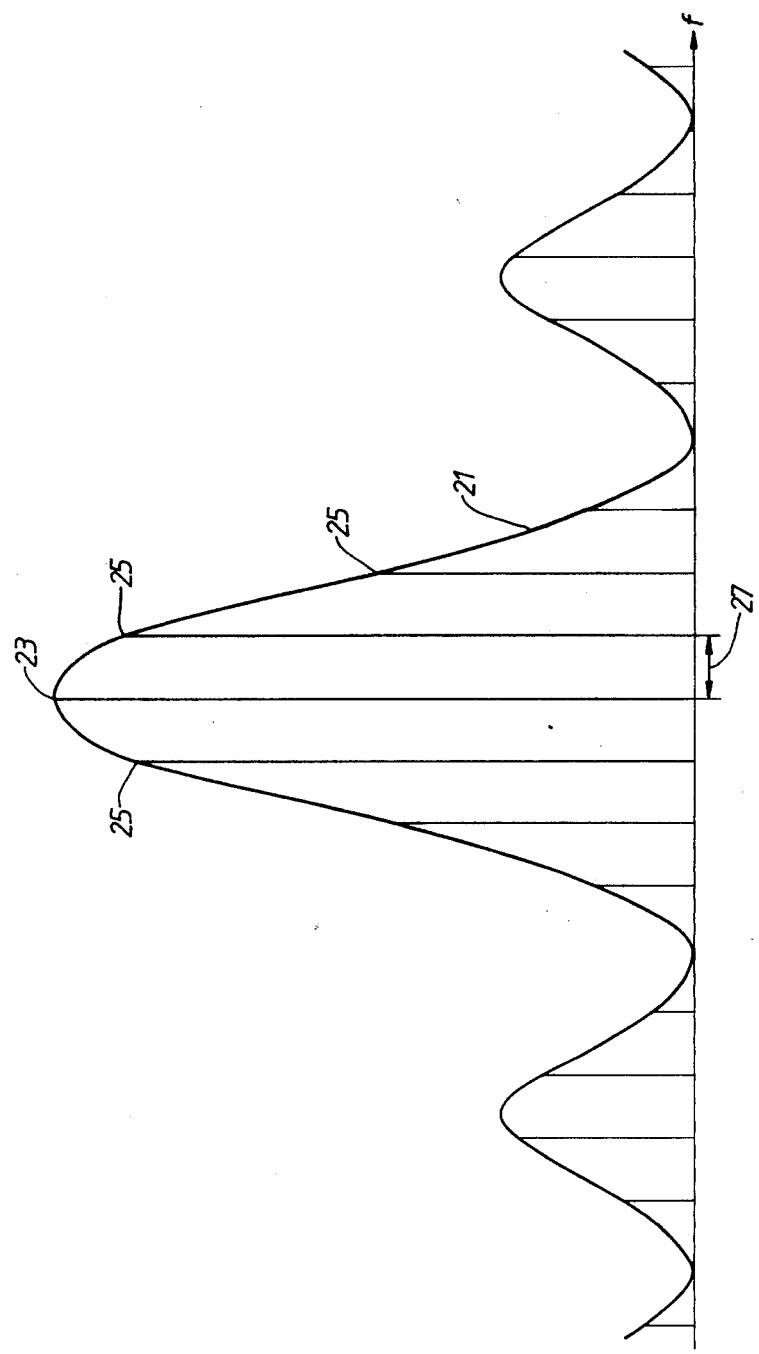
FIG. 2 is an illustration of the output a typical composite heterodyne signal.
Figure 3:
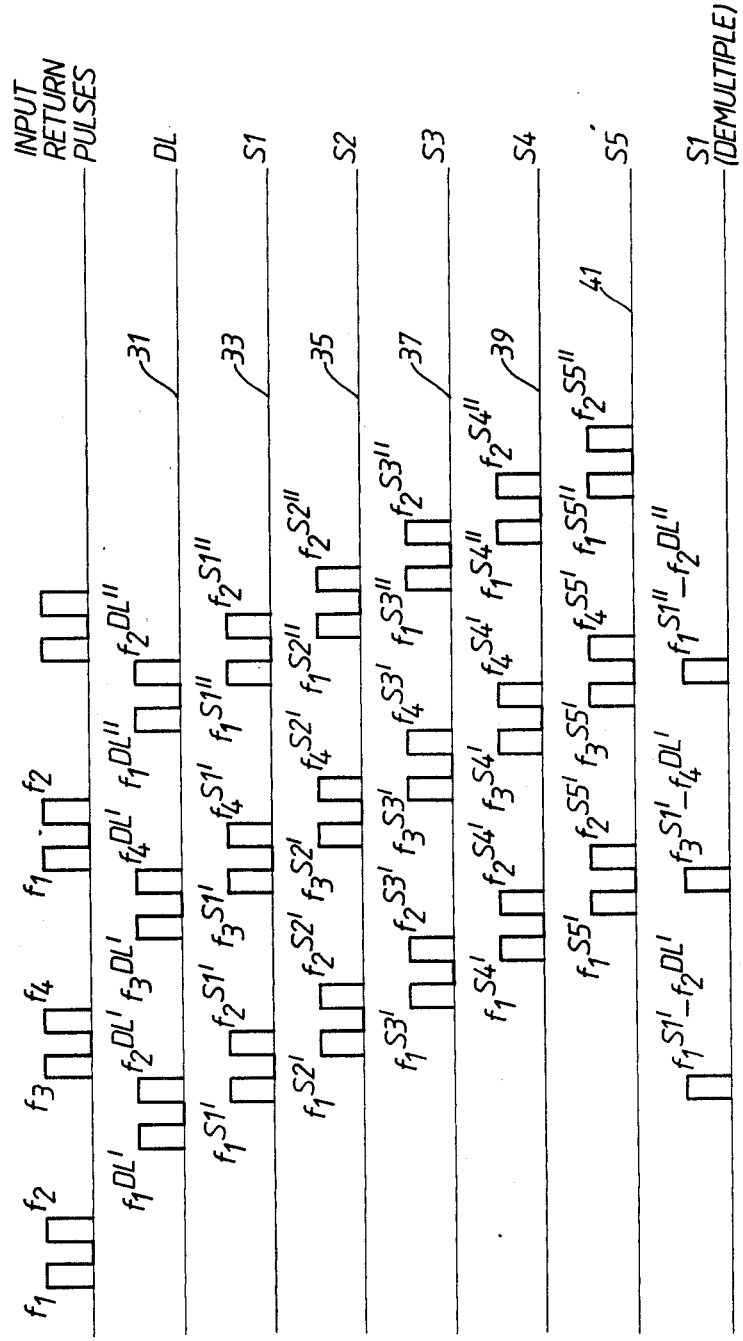
FIG. 3 illustrates a timing diagram for a single contiguous length of fibre 2 sensors according to one embodiment of the present invention.

In the embodiment of the present invention illustrated in FIG. 3 the effective pulse repetition rate is doubled. The conventional pulse length, i.e. equivalent to slightly less than twice the transit time of a light pulse in an optical fibre sensor length, has been halved without a similar reduction in the optical fibre sensor length. Although halving of the pulse length is illustrated it will be appreciated that different fixed fractions of the conventional pulse length may be used, with probably better results, provided the fixed fraction can be multiplied by a whole number to give unity and sufficient pulse length remains to allow interaction. With such reduced pulse lengths in addition to primary pulse pair $F_1$, $F_2$ there is injected into the contiguous length of optical fibres an intermediate pulse pair $F_3$, $F_4$. The respective spacing and pulse length of pulses in respective primary pulse pair $F_1$, $F_2$ and intermediate pulse pair $F_3$, $F_4$ are the same. The pairs $F_1$, $F_2$ and $F_3$, $F_4$ are reflected by partially reflective discontinuities DL, S1, S2, S3, S4 and S5 to provide reflected pulse trains (31, 33, 35, 37, 39 and 41). As can be seen reflected pulses from respective primary pulse pair $F_1$, $F_2$ and intermediate pulse pair $F_3$, $F_4$ do not interact, whilst reflected pulses within a reflected pair interact as previously described for the conventional system.

Each pulse in a pulse pair, whether primary $F_1$, $F_2$ or intermediate $F_3$, $F_4$, is respectively spaced by a period equivalent to the transit time across one sensor length. The respective spacing of primary $F_1$, $F_2$ and intermediate pulse pairs $F_3$, $F_4$ is dependent upon the down lead length and the number of sensor lengths but is arranged so that reflections from the primary pulse pair $F_1$, $F_2$ interleave with reflections from the intermediate pulse pair $F_3$, $F_4$. In the embodiment of FIG. 3, primary pulse pair $F_1$, $F_2$ and intermediate pulse pairs $F_3$, $F_4$ are spaced by inherent transit time of a pulse to the end of the contiguous length or array of optical fibre sensor lengths plus the transit time of a pulse through a single optical pulse length. Consequently, reflected pulses from the intermediate pulse pair $F_3$, $F_4$ in the first part of the array are interleaved with reflected pulses from the primary pulse pair $F_1$, $F_2$ in the second part of the array. The net effect is that the effective pulse repetition rate is doubled increasing the speed of interrogation of each optical fibre sensor length and allowing higher acoustic frequencies to be detected.

It will be appreciated that by reducing the pulse length further and appropriate spacing of pulse pairs, the pulse repetition rate may be further increased allowing higher acoustic frequencies to be detected.

Figure 4:
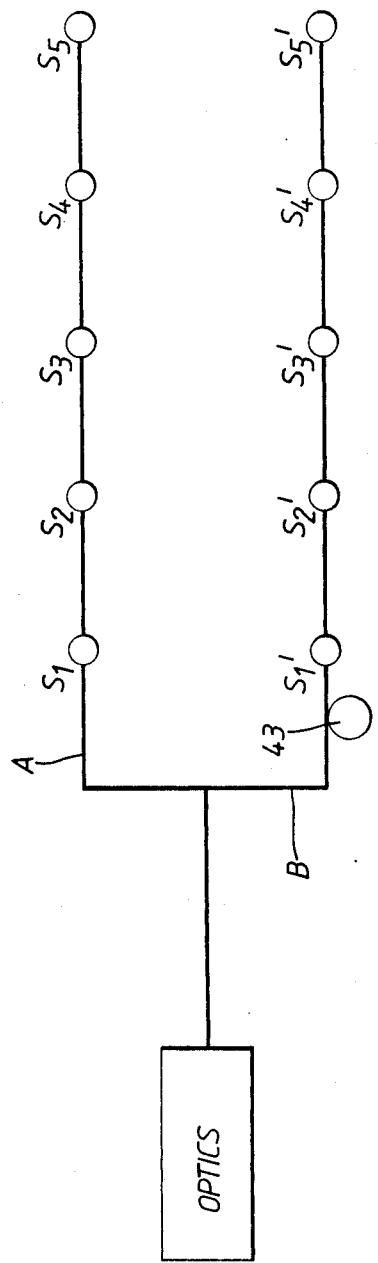
FIG. 4 illustrates, in block diagram form, a branched sensor system having two branched lengths of contiguous optical fibre sensors arranged according to a further embodiment of the present invention: and, FIG. 5 illustrates a timing diagram for the branched sensor system as illustrated in FIG. 4.
Figure 5:
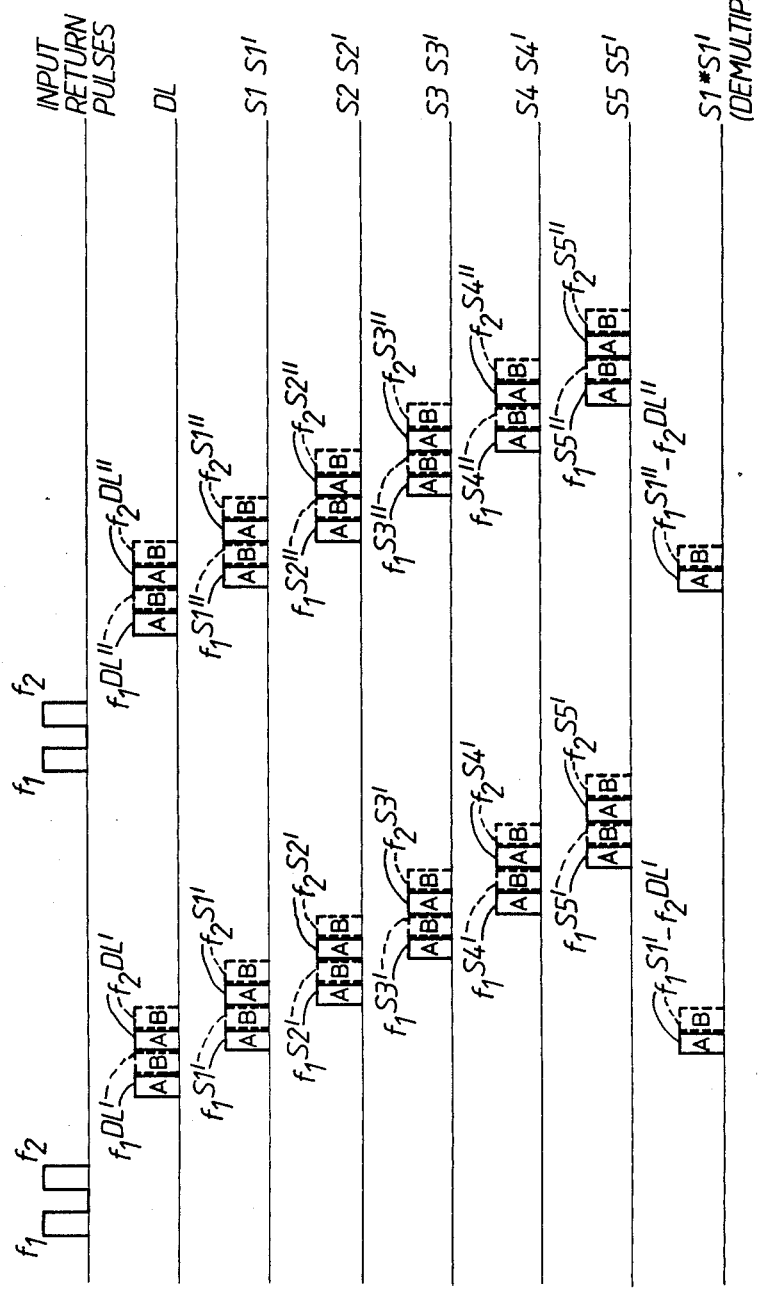

FIG. 4 illustrates, in block diagram form, an alternative embodiment of the present invention having two branched contiguous lengths or arrays of optical fibre sensors A, B. The array branches A, B are equivalent except that branch B has a delay element 43 prior to its sensors. In prior systems the delay element 43 would introduce a delay between branches A and B equivalent to twice the transit time of pulses to the end of branch A. Consequently, the pulse repetition interval was limited to approximately four times the transit time in either branch to allow return of pulses from both branches before injection of a further pulse pair. The delay element in the present invention introduces a delay equivalent to a fixed fraction of the pulse transit time to the end of either branch (as previously the fixed fraction should be multipliable by a whole number to provide unity) plus the transit time of a pulse across a single sensor. FIG. 5 is a timing diagram for the embodiment illustrated in FIG. 4. The pulse length in primary pair $F_1$, $F_2$ is limited as in FIG. 3 to slightly less than the fixed fraction of the transit time across a single sensor element.

The primary pulse pair F₁, F₂ is directed, in parallel, towards branches A and B. The pulse pair propagates along each branch A, B with partially reflected pulses being returned by their respective discontinuities. The delay element 43 acts to delay pulses in branch B with respect to branch A with the net result that partially reflected pulses in branch B interleave with partially reflective pulses of branch A. It will thus be appreciated that if the fixed fraction is ½ the effective pulse repetition frequency is doubled for a branched arrangement as shown in FIG. 4.

It will be appreciated that the present invention allows an increase in the effective pulse repetition or sensor element interrogation rate relative to the number of sensors and sensor length.

It will be appreciated that a sensing system could be constructed wherein the pulse pairs are replaced by single pulses. Each single pulse being reflected by the partially reflecting discontinuities and detector means being provided to divide the returned reflected pulses into two detector paths. The detector paths being arranged whereby there is a respective delay between the paths, and possibly a shift in frequency, such that correct interaction of reflected pulses from adjacent discontinuities can be achieved.

We claim:

1. An optical sensing system comprising a light source coupled to a switching element and a plurality of optical sensors having a partially reflective discontinuity between adjacent sensors, the plurality of optical sensors being coupled to detector means, the switching element being arranged to provide, in operation, light pulse trains in succession in a defined time spaced order, the time spaced order of light pulse trains being such that primary pulses in a primary light pulse train are provided at a primary time period spacing at least equivalent to twice an inherent transit time period of light pulses to the end of each contiguous length of optical sensors whilst at least one intermediate pulse in an intermediate light pulse train is provided at an intermediate time period with respect to primary light pulses, the intermediate time period being equivalent to a fixed fraction of the primary time period plus an inherent transit time period for light pulses across one sensor wherein respective primary and intermediate light pulses are respectively spaced and have a pulse length such that interaction between a reflected light pulse from a primary light pulse and a reflected light pulse from a intermediate light pulse is prevented.

2. An optical sensing system as claimed in claim 1 wherein the light pulses are arranged in pairs in mutual spaced succession and at respectively different frequencies.

3. An optical sensing system as claimed in claim 1 wherein the light pulses are arranged singularly and have substantially the same frequency.

4. An optical sensing system as claimed in claims 1 wherein the pulse length is substantially the equivalent of the fixed fraction of the inherent transit time of a light pulse in an optical fibre sensor length.

5. An optical sensing system as claimed in claim 1 wherein the plurality of optical sensors is configured into two, respectively contiguous, branches of optical fibre lengths, one of the branches having a delay element whereby, in operation, reflected pulses from partially reflective discontinuities in the branch having the delay element are interleaved with reflected pulses from the other branch such that reflected pulses from respectively different branches do not interact.

6. An optical sensing system as claimed in claim 1 wherein the fixed fraction is ½.

7. A method of operating an optical sensor system including a plurality of optical sensors arranged in at least one contiguous length and having partially reflective discontinuities between respective sensors arranged such that light pulse trains in mutual succession are injected into the plurality of optical sensors whereby said light pulses are partially reflected by the discontinuities to provide respective heterodyne signals upon detector means indicative of each optical sensor, the method comprising:

(i) providing primary light pulses in primary light pulse train in a time spaced period at least equivalent to twice the inherent transit time for a pulse from injection to an end of the plurality of optical sensors; and, (ii) providing, at least one intermediate light pulse in an intermediate light pulse train at an intermediate time spaced relationship with respect to each primary light pulse, said intermediate time spaced period being a fixed fraction of the primary time spaced periods, whilst the pulse length and respective spacing of light pulses in respective primary and intermediate light pulse trains is determined such that neither injected or reflected light pulses associated with the primary pulse interact upon the detector means with those light pulses associated with an intermediate pulse.

8. A method as claimed in claim 7 wherein the light pulses are arranged in pairs of light pulses in mutual spaced succession and at respectively different frequencies.

9. A method as claimed in claim 7 wherein the light pulses are arranged singularly, and have substantially equivalent frequency.

10. A method as claimed in claim 7 wherein the light pulses have a pulse length substantially the equivalent of the fixed fraction of the inherent transit time of a light pulse in each optical fibre sensor length.

11. A method as claimed claim 7 wherein the fixed fraction is ½.

* * * * *